United States Patent [19]

Depierre et al.

[11] 4,298,431
[45] Nov. 3, 1981

[54] DEVICE FOR THE THERMAL PROTECTION OF AN INTERNAL STRUCTURE OF A LIQUID METAL COOLED FAST REACTOR

[75] Inventors: Yves Depierre, Valensole; Jacques A. Figuet, Aix en Provence; Guy Lemercier, Le Puy Sainte Reparade, all of France

[73] Assignee: Commissariat a l'Energie Atomique, Paris, France

[21] Appl. No.: 913,110

[22] Filed: Jun. 6, 1978

[30] Foreign Application Priority Data

Jun. 13, 1977 [FR] France ............................... 77 18031
May 12, 1978 [FR] France ............................... 78 14195

[51] Int. Cl.³ ...................... G21C 15/12; G21C 13/02
[52] U.S. Cl. .................................................. 176/290
[58] Field of Search ..................... 176/37, 40, 65, 87, 176/38, DIG. 2

[56] References Cited

U.S. PATENT DOCUMENTS 3,489,206  1/1970  Lecourt ................................ 176/87
3,945,887  3/1976  Lemercier ..................... 176/DIG. 2
4,056,438  11/1977  Gama et al. ........................... 176/40
4,156,629  5/1979  Andreani et al. ..................... 176/38
4,167,445  9/1979  Aubert et al. ......................... 176/40

FOREIGN PATENT DOCUMENTS 1207036  9/1970  United Kingdom ................. 176/87

Primary Examiner—Stephen C. Bentley
Assistant Examiner—Edward F. Miles
Attorney, Agent, or Firm—Kerkam, Stowell, Kondracki & Clarke

[57] ABSTRACT

The fast reactor structure to be protected comprises a wall and a parallel cylindrical shell having a free top edge which forms an overflow sill. A diverted flow of liquid metal withdrawn from a principal volume is circulated upwards through a vertical space formed between the wall and the shell. The shell surface which is remote from the space is provided with a packing of heat-insulating elements so that the overflowing sheet of liquid metal which falls on the downstream side of the overflow sill passes through the packing before returning into the principal volume of liquid metal.

11 Claims, 11 Drawing Figures

DEVICE FOR THE THERMAL PROTECTION OF AN INTERNAL STRUCTURE OF A LIQUID METAL COOLED FAST REACTOR

This invention relates to a device for the thermal protection of an internal structure of a fast reactor which is cooled by a circulation of liquid metal and relates more especially to a device of this type which is adapted for cooling and thermal insulation of the main vessel of a fast reactor of integrated design.

It is known that a fast reactor which makes use of the so-called "integral" design concept is usually constituted by a thick-walled shielded enclosure or containment vault in which are mounted an open-topped main vessel having a vertical axis and a lateral cylindrical shell suspended from a horizontal top closure slab or vault roof. Said main vessel contains a suitable volume of liquid metal usually consisting of sodium whilst a blanket of neutral gas (usually argon) is present above the level of liquid sodium within the main vessel. The reactor core constituted by an array of adjacent fuel assemblies rests on a diagrid which is in turn supported on the bottom wall of the main vessel by a metallic flooring structure. The reactor core is surrounded by a second vessel or so-called primary vessel which is mounted within the main vessel and the liquid sodium is circulated upwards through the core. The hot sodium which has absorbed the heat generated by the core assemblies is collected within the inner vessel before being directed towards inlet orifices formed at the top ends of heat exchangers which are disposed at intervals around the reactor core and supported by the vault roof through which they extend in leak-tight manner. The sodium which is cooled by passing through said heat exchangers is discharged from these latter through outlet orifices formed at the lower ends thereof and distributed within the space delimited between the main vessel and the inner vessel beneath a skew wall which is rigidly fixed to said inner vessel and traversed by the heat-exchanger shells. Said skew wall thus makes it possible to separate the hot sodium within the inner vessel from the cold sodium between this latter and the main vessel. The cold sodium is then recirculated by pumps which are also disposed at intervals around the reactor core between the heat exchangers, said pumps being suspended from the vault roof in the same manner as the exchangers and adapted to return the cold sodium into the diagrid beneath the reactor core at a sufficient pressure to permit a further passage through this latter and to maintain continuous circulation within the main vessel. The design solution thus described consequently corresponds to integration within the main vessel, not only of the inner vessel and of the reactor core but also of the heat exchangers and pumps whilst the volume of liquid sodium coolant thus remains confined within the main vessel itself.

In a conventional design of this type, it has already been proposed to carry out continuous cooling of the internal wall of the main vessel, especially at the upper portion of its cylindrical shell which is normally in contact with or in the vicinity of the mass of hot liquid sodium collected within the inner vessel, above the transverse skew wall. To this end, a parallel cylindrical shell or so-called baffle wall is placed against the main vessel wall, provision being made between said walls for an annular space through which a flow of cold sodium is circulated in the upward direction. Said flow of cold sodium is withdrawn from the zone delimited between the main vessel and the inner vessel beneath said skew wall and is preferably diverted into the diagrid from leakages occurring at the lower ends of the fuel assemblies which are engaged in support columns provided in said diagrid. Thus the flow of cold sodium passes between the main vessel and the baffle wall to the upper extremity or edge of this latter, then flows over said edge which forms a weir either directly into the inner vessel or preferably between said baffle wall and a parallel counter-baffle into a second annular space which communicates with the cold sodium zone beneath the skew wall. If necessary, a siphon device can be arranged between the main vessel, the baffle wall and the counter-baffle in order to improve the circulation of the diverted sodium flow and to ensure more effective cooling of the main vessel.

In point of fact, although a structure of the type described in the foregoing is well suited to integrated reactors of average power, said structure is likely to prove less advantageous in future reactors having higher power outputs since it involves not only a certain complication of the basic vessel geometry but also calls for special precautions in order to regulate the gas pressure within the siphon and results in variations in level of the liquid sodium coolant along the main vessel wall according to the power level at which the reactor is operating. Finally, postulating the simplest design in which the sodium flow is discharged freely over the top edge of the baffle wall which may be either continuous or recessed and the profile of which has been studied in order to prevent separation of the overflowing sheet on the downstream side of said edge as far as possible, there is another disadvantage to be taken into consideration, namely the entrainment of blanket gas which is present above the sodium level within the vessel beneath the vault roof. Even if it can be limited to a low value in the case of a small height of fall, said gas entrainment is liable to become excessive in the event of an increase in the height of fall or in the event of an increase in flow rate. In such a case, the presence of gas bubbles within the liquid mass is disadvantageous from a hydraulic and thermal standpoint and also produces an adverse effect in regard to neutron flux characteristics.

A last solution which arises from the preceding consists in splitting-up the overflowing sheet of liquid sodium by means of spouts, chutes and the like, the shape and distribution of which are adapted to maintain a substantially laminar flow regime with a view to minimizing gas entrainment and bubble formation. Once again, however, the effectiveness of the solution does not prove wholly satisfactory since the fractional distribution of liquid discharged through a relatively small number of spouts is still liable to cause entrainment of blanket gas at relatively high operating regimes of the reactor.

This invention is concerned with an improvement in the arrangements recalled in the foregoing, as applicable in particular to an internal nuclear reactor structure and more especially to a main reactor vessel, the internal surface of which is associated with a parallel baffle wall for delimiting a space in which a flow of liquid metal coolant is intended to circulate. This improvement accordingly makes it possible to reduce the velocity of fall of said flow on the downstream side of the free top edge of said baffle wall to the point at which it returns to the level of the liquid metal within the vessel. Thus it is no longer necessary to have recourse to discrete means for splitting-up said flow, to the use of any dynamic system or any control means of the gas-pressure siphon type.

To this end, the device under consideration is adapted to a structure comprising a wall and a parallel cylindrical shell provided at the upper end with a free edge forming an overflow sill, there being delimited between said wall and said shell a vertically-extending space through which is circulated in the upward direction a diverted flow of liquid metal withdrawn from a principal volume of said liquid metal in which the lower portion of said wall is immersed. The device is distinguished by the fact that the surface of said cylindrical shell which is remote from said space is provided with a packing of heat-insulating elements so that the overflowing sheet of liquid metal which falls on the downstream side of said overflow sill passes through said packing before being returned into said principal volume of liquid metal.

In a first embodiment, the packing of heat-insulating elements is constituted by a stack of wire mesh or metallic trelliswork elements applied against the surface of the cylindrical shell. As an advantageous feature, when the structure is constituted by the wall of the main reactor vessel and is associated with a baffle wall and counter-baffle in parallel relation, the stack of wire mesh or metallic trelliswork elements is applied against that face of the baffle wall which is directed towards the counter-baffle, the flow of diverted liquid metal which is circulated through the stack being returned into the space formed between the main vessel and the inner vessel beneath the transverse skew wall of said inner vessel.

In accordance with one distinctive feature, the stack of wire mesh or metallic trelliswork elements is constituted by superposed layers of juxtaposed modular panels which cover the surface of the cylindrical shell, the thickness of said panels being either equal or different from one layer to another. If so required, the layers are separated by thin sheet metal elements or by a grid having a greater thickness than the wire mesh or metallic trelliswork elements.

Preferably, the panels of wire mesh or metallic trelliswork elements are arranged in superposed layers having edges which are laterally displaced from one panel to the other in order to form a continuous mat by overlapping of the different layers, the surface of the cylindrical shell being thus entirely covered to the depth which is necessary for vertical downward discharge of the liquid metal at a low rate of flow.

In accordance with another distinctive feature, each panel of the last layer of the stack starting from the structure to be protected is fitted with a covering plate which is parallel to the surface of the cylindrical shell for applying the stack against said surface under a suitable compressive force by means of at least one clamping stud which is secured to the cylindrical shell and passed through the stack, said stud being adapted to cooperate with a nut which is screwed on the end of the stud and exerts a predetermined pressure on the covering plate.

In accordance with a further distinctive feature, the stack of wire mesh or metallic trelliswork elements is assembled in such a manner as to ensure that the top face of the stack is located below the edge of the cylindrical shell which forms an overflow sill, said top face being covered by a component for distributing the flow of the liquid metal sheet during overflow discharge.

Depending on requirements, the flow-distributing component is constituted by a perforated grid or by a stack of wire fabric elements.

In another embodiment, the packing of heat-insulating elements is constituted by packing elements arranged at random within a space delimited between the cylindrical shell, a sheet-metal wall parallel to said shell and a transverse partition which forms a bottom wall and extends between the cylindrical shell and the sheet-metal wall.

The sheet-metal wall and the partition which forms a bottom wall can be constructed as a single unit and thus be designed in the form of an L-section member which is parallel to the cylindrical shell or else the sheet metal wall and the partition which forms the bottom wall can be constructed in two parts which are suitably assembled together. In order to allow the flow of liquid metal to flow towards the exterior after passing through the packing of heat-insulating elements, the bottom partition and/or the sheet-metal wall which is parallel to the cylindrical shell in the vicinity of said partition are provided with orifices through which the liquid metal is intended to pass.

In a particular embodiment, the bottom partition is duplicated by a plate which is rigidly fixed to the cylindrical shell and extends beneath said partition, said plate being provided at the end remote from the shell with a raised edge so that the flow of liquid metal which first passes through the orifices of the partition is returned upwards in order to facilitate discharge of any gas derived from the atmosphere which prevails above the level of liquid metal within the vessel and which may have been carried along with said flow of liquid metal.

In another alternative embodiment, the bottom partition is directly extended by means of a raised edge beyond the sheet-metal wall which is parallel to the cylindrical shell, said raised edge being intended to delimit a zone in which the flow of liquid metal is returned upwards after passing through orifices formed in the sheet-metal wall in the vicinity of said partition in order to facilitate discharge of entrained gas as in the previous embodiment.

The heat-insulating elements placed at random against the cylindrical shell can have different shapes and can be constituted in particular by Raschig rings, Pall rings, Berl saddles or else by metallic coil springs.

Further distinctive features of a device for the thermal protection of a nuclear reactor structure in accordance with the design contemplated by the invention will become apparent from the following description of a number of exemplified embodiments given by way of indication without any limitation being implied, reference being made to the accompanying drawings, wherein.

Figure 1:
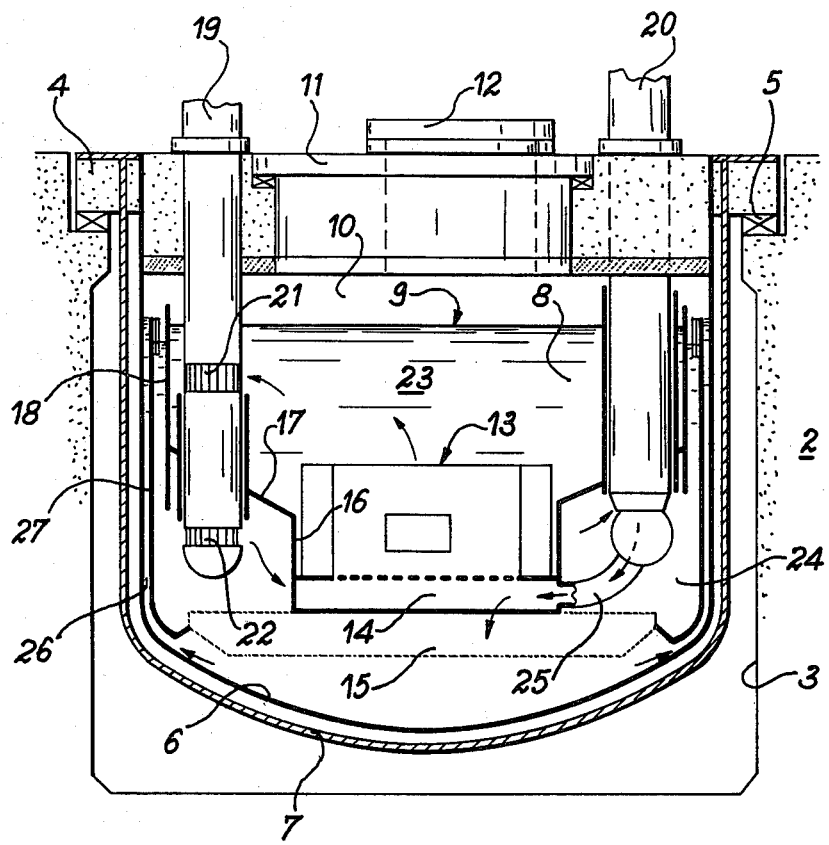
FIG. 1 is a diagrammatic vertical sectional view of a fast reactor of integrated design which entails the use of the device in accordance with the invention for ensuring thermal protection of the main vessel wall.

In FIG. 1, the reference numeral 1 designates the complete reactor block of a fast neutron reactor of integrated design. As shown diagrammatically in this figure, the reactor comprises in particular a containment structure 2 having concrete walls of substantial thickness and a reactor vault 3 within which is placed the reactor proper. Said containment vault is closed by means of a horizontal top closure slab or vault roof 4 which is supported on a corbel of the containment structure 2 by bearing means 5. There is placed within the reactor vault 3 a first vessel 6 or so-called main vessel surrounded by a second vessel 7 having a parallel wall or so-called safety vessel, the open upper ends of the vessels 6 and 7 being suspended from the reactor vault roof 4. The main vessel 6 contains a volume 8 of a liquid metal coolant usually consisting of sodium. The top level of the liquid sodium within the vessel is designated by the reference 9 and separated from the bottom face of the vault roof 4 by a space 10 filled with an inert gas blanket usually consisting of argon.

In a manner known per se, the vault roof 4 is provided with a system of rotating shield plugs shown diagrammatically at 11 and 12 for gaining access to the interior of the main vessel 2 and to the reactor core 13 beneath the level 9 of the volume 8 of liquid sodium. Said reactor core is immersed in the sodium and formed by a juxtaposed array of fuel assemblies (not shown in the drawings) which rest on a bottom support grid 14 or so-called diagrid which is in turn applied against the bottom wall of the main vessel 6 by means of a metallic flooring structure 15. The reactor core 13 is contained within a third vessel 16 or so-called inner vessel having an extension in the form of a transverse skew wall 17 and terminating in a lateral cylindrical shell 18 which is coaxial with the lateral wall of the main vessel 6 and extends at a short distance from this latter.

In accordance with an arrangement which is also conventional and arises from the integrated concept adopted in the case of the reactor under consideration, the containment vault roof 4 supports a series of heat exchangers 19 and circulating pumps 20 which extend through said roof in leak-tight manner and penetrate into the interior of the main vessel 6 beneath the level 9. Said heat exchangers and said pumps are spaced at suitable intervals around the reactor core and pass through the skew wall 17 which forms an extension of the inner vessel 16. Each heat exchanger 19 is provided with inlet windows 21 located above the skew wall 17 and with outlet windows 22 located beneath said skew wall.

By virtue of the foregoing arrangements, the hot sodium at the outlet of the reactor core 13 first gains heat within this latter as it comes into contact with the fuel assemblies, is collected in the zone 23 which is delimited within the inner vessel 16 by the skew wall 17 and the cylindrical shell 18, then passes into the heat exchangers 19 through the windows 21. After cooling, said liquid sodium is returned through the heat exchanger outlet windows 22 into the zone 24 located beneath said skew wall 17 between the main vessel 6 and inner vessel 16. Within said zone 24, the cold sodium is recirculated by the pumps 20 and passed back under a suitable pressure through large-section ducts 25 into the diagrid 14 in order to undergo a further passage through the reactor core before again returning into the zone 23.

In accordance with an arrangement which is already known, part of the cold sodium which is discharged into the diagrid 14 beneath the reactor core by the circulating pumps 20 escapes through said diagrid and the flooring structure 15 in order to pass through the annular space 26 delimited between the lateral wall of the main vessel 6 and a coaxial cylindrical shell 27 which forms a baffle wall. By means of this diverted flow of liquid sodium, suitable cooling of the vessel wall can thus be performed continuously. This cooling action is necessary especially for preventing any danger of formation and stagnation of a hotter sodium layer in contact with the main vessel since this would give rise to problems of metal fatigue as a result of temperature variations at the different reactor power levels. Such problems would have the effect of impairing the mechanical strength of the reactor vessel to a marked degree and would eventually lead to major hazards involving safety of the installation as a whole.

In order to overcome this disadvantage, provision has therefore already been made for continuous cooling of the lateral wall of the main vessel 6 by means of the by-pass flow of cold sodium which circulates in the upward direction within the space 26 between the wall of said vessel and the baffle wall 27.

Figure 2:
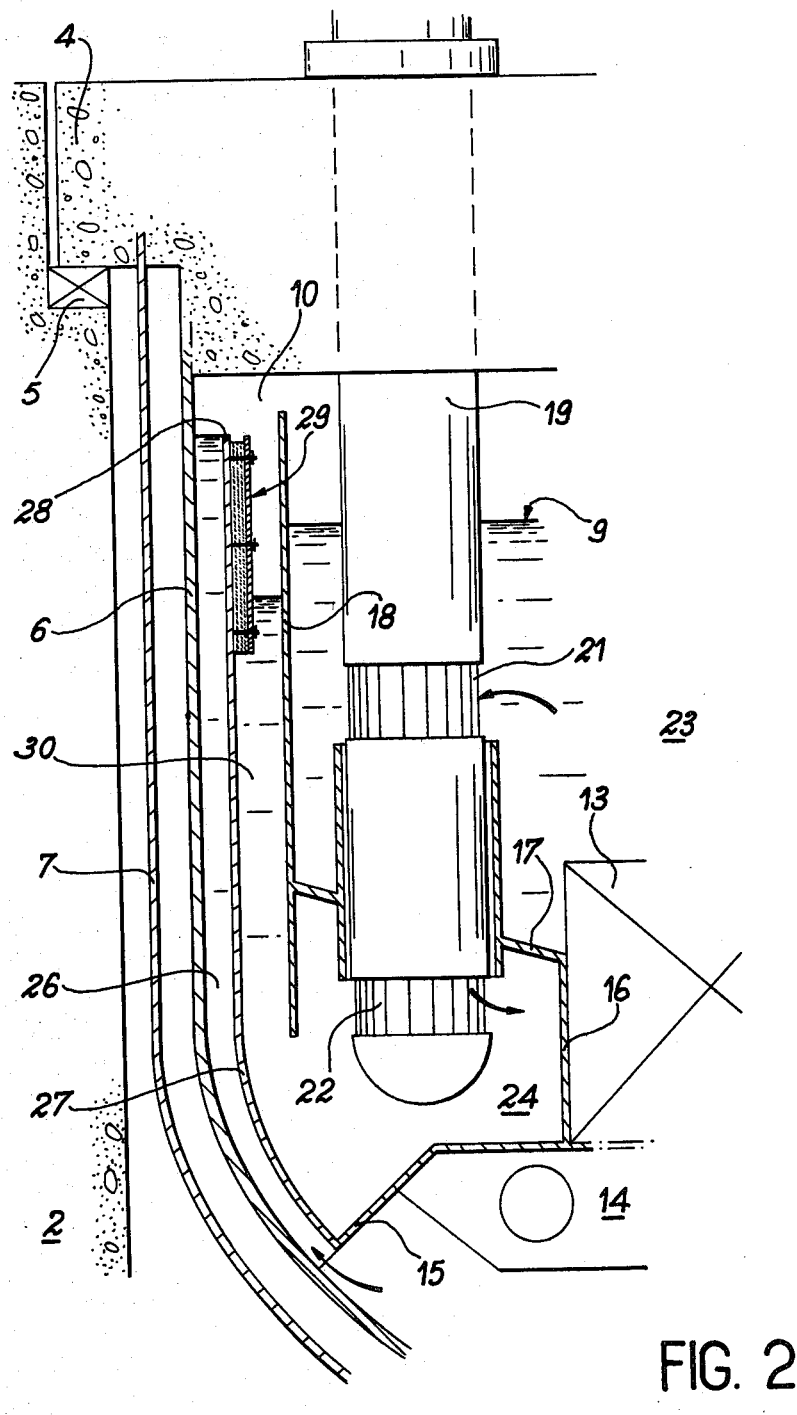
FIG. 2 is a sectional view to a larger scale showing a part of FIG. 1 including a heat exchanger and providing a more complete illustration of the structure of the device under consideration in a first alternative embodiment.

Referring now to FIG. 2, it is apparent that the manner in which the top portion of the baffle wall 27 is arranged in accordance with the invention is shown in greater detail in this figure. Thus the liquid sodium which circulates within the space 26 is permitted to flow over the free top edge 28 of the baffle wall 27 which forms an overflow sill and to return into the zone 24 which is external to the inner vessel 16 without carrying away any blanket gas from the zone 10 and especially without producing any harmful entrainment of bubbles within the sodium.

To this end and in a first alternative embodiment, a packing formed by a stack 29 of wire mesh or metallic trelliswork elements is placed against that surface of the baffle wall 27 which is directed towards the cylindrical shell 18 forming an extension of the skew wall 17 of the inner vessel 16. Said stack is adapted to collect the overflowing sheet of liquid sodium which flows over the top end or edge 28 of the baffle wall 27, thus suitably reducing the rate of flow of sodium while also making it possible to return this flow into the space 30 between the baffle wall 27 and the cylindrical shell 18 which communicates with the zone 24. As an advantageous feature, the edge 28 can be suitably profiled at 28a (as shown in FIG. 3) in order to facilitate the downflow of the overflowing sheet of liquid sodium and to maintain the sheet of liquid sodium applied against the baffle wall at any operating regime of the reactor.

Figure 3:
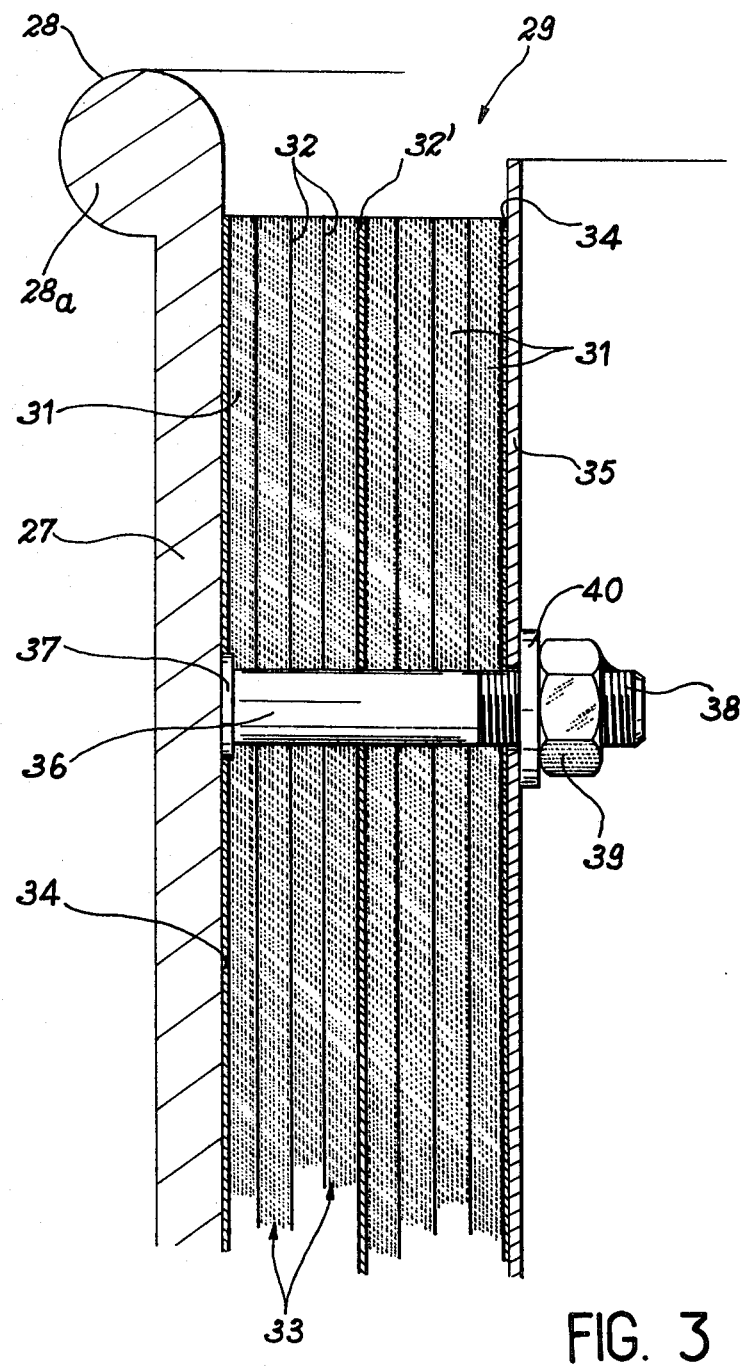
FIG. 3 is a sectional view to an even larger scale showing the protection device in accordance with FIG. 2.

FIG. 3 illustrates a first embodiment of the stack 29 as employed in the manner which has been set forth in the foregoing. In this first alternative embodiment, the stack has the appearance of a mattress constituted by superposed layers of a series of juxtaposed modular panels 33 each formed of successive wire mesh or metallic trelliswork elements 31. The edges of the panels 33 are relatively displaced from one layer to the next in order to ensure that this latter covers the discontinuities of the previous layer. The surface of the cylindrical shell is thus covered with a continuous mat-type layer of constant height and thickness.

The first and last layers are covered on the external side of the stack by sealing elements 34 of thin sheet metal which partly overlap in the direction of flow in much the same manner as the tiles of a roof in order to prevent any leakage of the overflow sheet outside the stack.

The different panels 33 can be either stacked one above the other so as to form a continuous mat or separated by intercalary sheet metal elements 32 which partly overlap or by a grid 32', the thickness of which is greater than that of the wire mesh or metallic trelliswork elements.

The panels 33 are applied against the surface of the baffle wall 27 by means of covering plates 35 which are in contact with the panels 33 of the last layer of the stack. These plates 35 have a modular structure and the edges of the plates 35 of two adjacent panels are separated by a clearance space. Depending on requirements, provision can be made for either one or a number of plates 35 on each panel 33 of the last layer. The plates 35 serve to maintain the stack of panels in position by means of at least one stud 36 which is fixed at the base 37 of said stud against the surface of the baffle wall and fitted at the suitably threaded opposite end 38 with a clamping nut 39 in cooperating relation with a bearing washer 40. As an advantageous feature, the panels formed by the stack of wire mesh or metallic trelliswork elements of the type mentioned above can be of the same type as those described and claimed in French Pat. No. 2,241,849, No. 2,235,329, No. 2,235,461 and No. 2,283,518 in the name of Commissariat a l'Energie Atomique. However, in these design solutions of the prior art, panels of this type perform a totally different function inasmuch as they are adapted to form heat-insulating structures for the thermal protection of the bottom surface of the horizontal roof which closes the reactor containment vault or of the main vessel in that region in which this latter is joined to said vault roof.

In the present invention, the stack 29 applied against the baffle wall is essentially intended to produce a retarding action on the flow of liquid sodium during downward discharge. Furthermore, said stack achieves enhanced thermal protection of the cooling circuit, especially in the case of operation at a low rate of flow. While said stack is wholly permeable to the by-pass flow of sodium discharged over the free edge 28 of the baffle wall, the inherent character of said stack in fact introduces a suitable resistance in the flow and produces a suitable pressure drop which is sufficient to reduce the acceleration due to gravity and to maintain the rate of flow below the threshold of entrainment of the inert gas from the zone 10. At the base of the stack 29, the flow of sodium thus retarded returns directly into the space between the baffle wall 27 and the cylindrical shell 18.

Within each of the layers formed by the heat-insulating panels, the wire mesh or metallic trelliswork elements can have either the same thickness or different thicknesses whilst the number of wire mesh elements can also be variable from one layer to the next as a function of the characteristics of said elements. It should be noted that these latter are advantageously stapled together.

The number of fixing studs can be so determined as to distribute these latter at suitable intervals in the baffle wall 27 in order to ensure reliable attachment of the stack according to the dimensions of the baffle wall and of the covering plates and according to the thickness of said stack.

Figure 4:
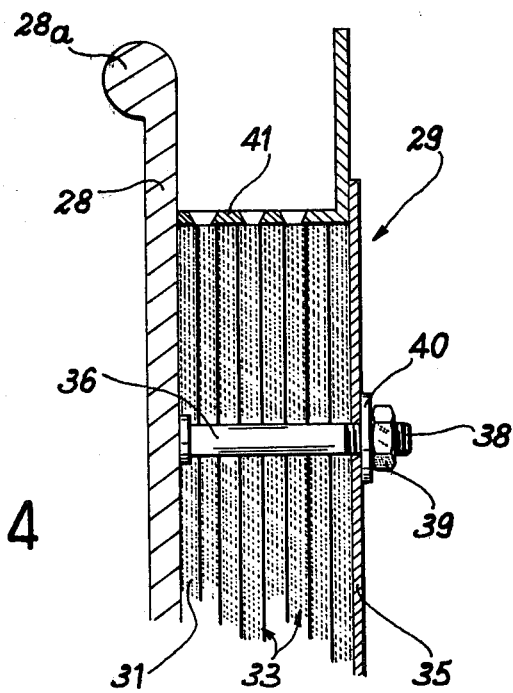
FIGS. 4 and 5 illustrate two further alternative embodiments of the device shown in FIG. 3.
Figure 5:
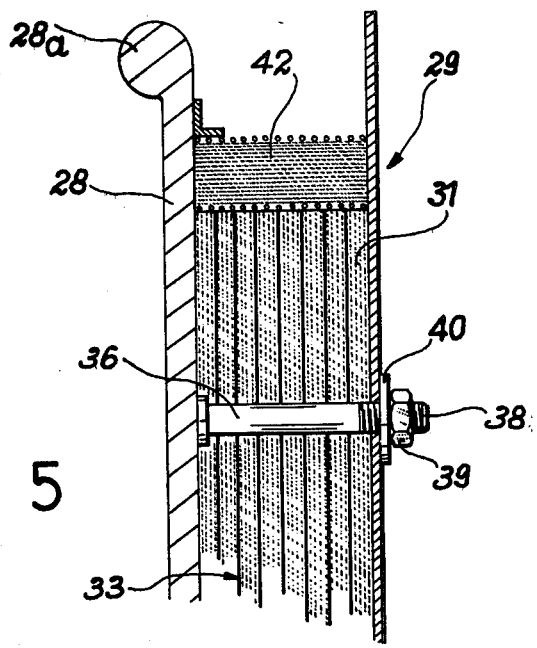

FIGS. 4 and 5 illustrate two further alternative embodiments of the protection device which is applied against the baffle wall in order to reduce the rate of flow of the by-pass stream which flows over the free edge of said wall. In the example shown in FIG. 4, the top end of the stack 29 which receives the overflow discharge of sodium is provided with a flow-distributing component 41 for suitably equalizing the flow of the overflow sheet throughout the thickness of the structure, said component 41 being constituted by a perforated grid. In the other alternative embodiment illustrated in FIG. 5, the flow-distributing component is constituted by a stack of wire fabric elements 42 placed in the horizontal direction and at right angles to the stack planes of the panels 33. In all cases, the thickness and the density of the different layers constituted by the panels applied against the baffle wall are calculated so as to ensure that the flow of sodium takes place without clogging at the maximum power level of the reactor. Moreover, the possibility of producing slight compression of the stack at the time of assembly by means of studs for clamping against the baffle wall permits multiple combinations in the choice of constituent elements of said stack and a very broad range of choice in the possibilities of adaptation.

Figure 6:
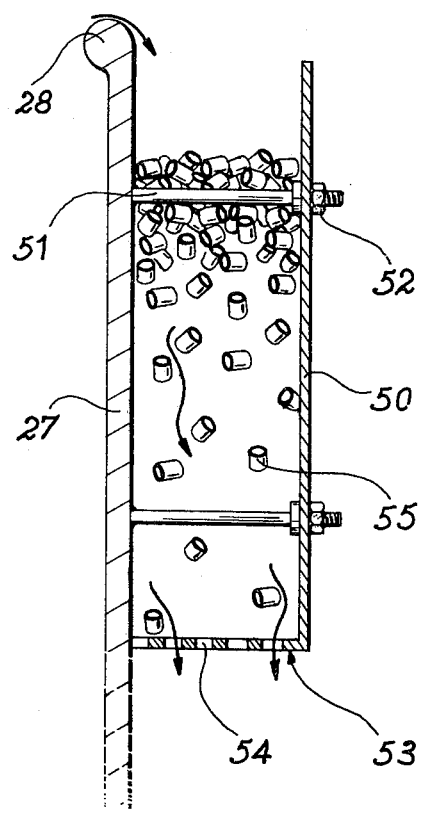
FIG. 6 is a diagrammatic transverse sectional view illustrating yet another alternative embodiment with heat-insulating elements arranged as random packing elements.

FIG. 6 relates to another alternative embodiment in which the panels of wire mesh or metallic trelliswork elements are replaced by random packing elements. In this case, a sheet-metal wall 50 is placed parallel to the cylindrical shell 27 of the baffle wall and joined to said shell by means of studs 51 extending through the sheet-metal wall 50 and secured against this latter by means of nuts 52. The sheet-metal wall 50, the cylindrical shell 27 and a transverse partition 53 placed at the lower end of the wall serve to delimit a space which is open at the upper end and into which the liquid metal flow over the upper end of the baffle is discharged. The bottom partition 53 is provided with orifices 54 through which the flow of liquid metal is intended to pass. The space thus delimited is accordingly filled with heat-insulating random packing elements 55 which, in the exemplified embodiment shown in FIG. 6, are constituted by small cylindrical elements of the Raschig ring type.

Figure 7A:
FIGS. 7a, 7b and 7c illustrate respectively three alternative designs of the heat-insulating elements shown in FIG. 5.
Figure 7B:
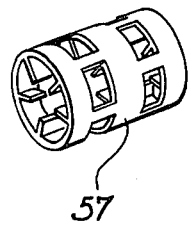
Figure 7C:
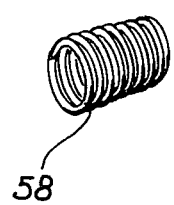

In the alternative embodiments illustrated in FIGS. 7a, 7b and 7c, further alternative designs are shown in which the heat-insulating elements are constituted by Berl saddles 56 (FIG. 7a), Pall rings 57 (FIG. 7b) or else metallic coil springs 58 (FIG. 7c), these different forms of packing element being given without any implied limitation.

Figure 8:
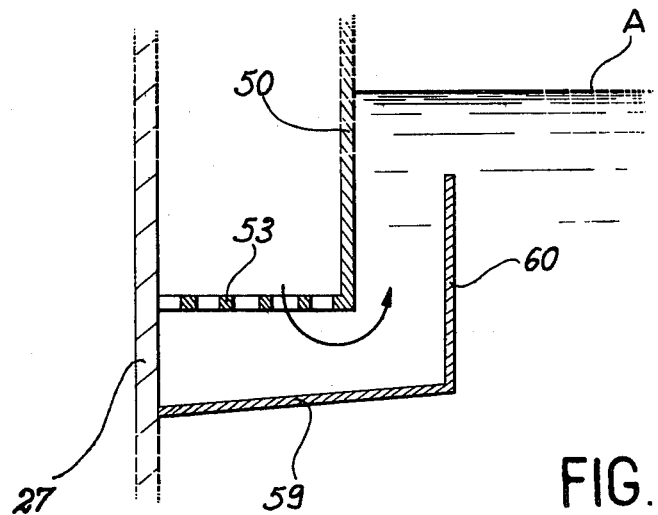
FIGS. 8 and 9 are diagrammatic views in partial transverse cross-section illustrating two further alternative embodiments.

In FIG. 8, the sheet-metal wall 50 and the bottom partition 53 for delimiting with the cylindrical shell 27 the space in which the heat-insulating packing elements are placed at random are associated with a plate 59 which extends substantially parallel with the partition 53. Said plate 59 is rigidly fixed to the cylindrical shell 27 and provided with a raised edge 60 at the opposite end. By virtue of these arrangements, the liquid metal flow which has passed through the orifices 54 formed in the bottom partition 53 is permitted to undergo a reversal of its direction of flow substantially through an angle of 180° in order to facilitate the escape of any blanket gas which may have been entrained by the overflow sheet of liquid sodium as this sheet passes over the top edge of the wall 27 before the liquid metal flow returns to the main volume which is contained within the vessel and the level of which is designated in the figure by the reference A.

Figure 9:
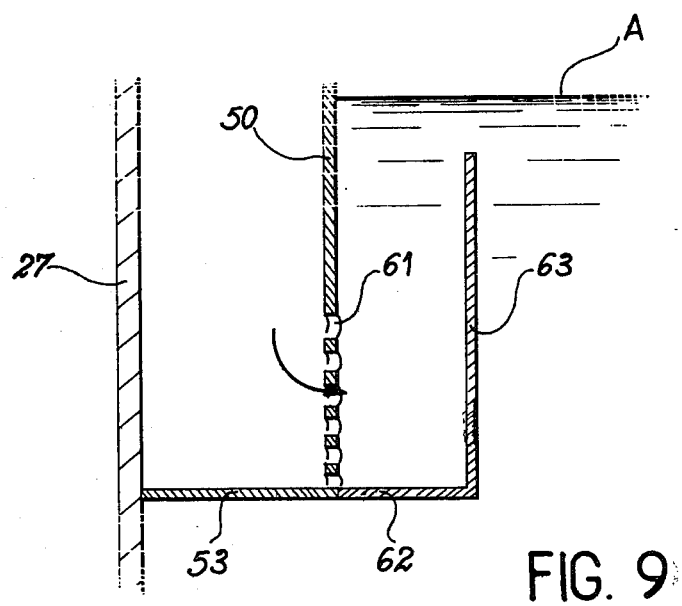

Finally, in another alternative embodiment illustrated in FIG. 9, the bottom partition 53 is not provided with any flow orifices, these latter being designated by the reference 61 and provided in the lower portion of the sheet-metal wall 50 which is parallel to the cylindrical shell 27. In this case, the bottom partition 53 has an extension 62 beyond the sheet-metal wall 50 and is again provided with a raised edge 63, with the result that the liquid metal flow which passes through said orifices 61 also undergoes a reversal of its direction of flow through an angle of 180° in order to facilitate degassing before returning to the volume of liquid metal within the vessel.

We claim:

1. A thermal protection device for the thermal protection of a structure for a liquid-metal cooled nuclear reactor in which said structure comprises an outer vertical cylindrical wall and a coaxial cylindrical shell therein having at its upper end a free edge forming an overflow sill for said liquid metal, there being delimited between said wall and said shell a vertically-extending annular space through which is circulated in the upward direction a diverted flow of liquid metal withdrawn from a volume of said liquid metal in which a lower portion of said wall is immersed, wherein a surface of said cylindrical shell which is remote from said space has a packing of heat-insulating elements fixed on the entire periphery of said wall so that an over-flowing sheet of liquid metal which falls on the downstream side of said overflow sill passes through said packing before being returned into said volume of liquid metal, wherein the packing of heat-insulating elements is so disposed that a top face of the packing is located below the edges of the cylindrical shell which forms an overflow sill, said top face being covered by a distributor for distributing the flow of the liquid metal during overflow discharge, wherein a flow-distributing component is a perforated grid.

2. A thermal protection device according to claim 1, wherein the packing of heat-insulating elements is a stack of wire mesh or metallic trelliswork elements secured to the surface of the cylindrical shell.

3. A thermal protection device according to claim 2, wherein the stack of wire mesh and of metallic trelliswork elements comprises layers of a series of adjacent panels which cover the surface of the cylindrical shell, and the thickness of said panels may vary from one layer to another.

4. A thermal protection device according to claim 3, wherein edges of the panels of the superposed layers are laterally displaced from one layer to the next in such a manner as to cover said edges with the successive layers of panels so as to form a continuous mat of constant height and thickness over the surface of the cylindrical shell.

5. A thermal protection device according to claim 3, wherein the panels of inner and outer layers are covered on an external side of the stack with sealing elements of thin sheet metal which partly overlap in order to prevent any leakage of the overflow sheet of liquid metal outside the stack.

6. A thermal protection device according to claim 3, wherein the panels of intermediate layers are separated by thin sheet metal elements and also by a grid having a greater thickness than the wire mesh or metallic trelliswork elements.

7. A thermal protection device according to claim 3, wherein each panel of an outer layer of the stack is fitted with a covering plate which is parallel to the surface of the cylindrical shell for holding the stack against said surface under a suitable compressive force by means of at least one clamping stud secured to said cylindrical shell and passed through said stack, said stud being adapted to cooperate with a nut which is screwed on the end of the stud and exerts a predetermined pressure on the covering plate.

8. A thermal protection device according to claim 7, wherein edges of said covering plates of two adjacent panels are separated by a clearance space.

9. A thermal protection device for the thermal protection of a structure for a liquid-metal cooled nuclear reactor in which said structure comprises an outer vertical cylindrical wall and a coaxial cylindrical shell therein having at its upper end a free edge forming an overflow sill for said liquid metal, there being delimited between said wall and said shell a vertically-extending annular space through which is circulated in the upward direction a diverted flow of liquid metal withdrawn from a volume of said liquid metal in which a lower portion of said wall is immersed, wherein a surface of said cylindrical shell which is remote from said space has a packing of heat-insulating elements fixed on the entire periphery of said wall so that an over-flowing sheet of liquid metal which falls on the downstream side of said overflow sill passes through said packing before being returned into said volume of liquid metal, wherein the packing of heat-insulating elements comprises packing elements arranged at random within a space delimited between the cylindrical shell, a sheet-metal wall parallel to said shell and a partition bottom wall transverse to the shell which extends between said cylindrical shell and said sheet-metal wall, wherein the sheet-metal wall and the partition bottom wall are a single unit in the form of an L-section member which is parallel to the cylindrical shell wherein the sheet-metal wall which is parallel to the cylindrical shell adjacent said partition is provided with orifices through which the liquid metal passes, wherein the bottom partition is directly extended by means of a raised edge beyond the sheet-metal wall, said raised edge depending from the bottom partition parallel a to baffle wall, said raised edge, said sheet-metal wall, and said baffle wall constituting means for returning the flow of liquid metal upwards after passing through orifices formed in said sheet-metal wall in the vicinity of said partition in order to facilitate discharge of entrained gas.

10. A thermal protection device according to claim 9, wherein the heat-insulating elements placed at random against the cylindrical shell have a number of different shapes and are constituted by Raschig rings, Pall rings, Berl saddles and also by metallic coil springs.

11. A thermal protection device according to claim 9, wherein said structure is the internal wall of a main reactor vessel, said cylindrical shell being a baffle wall which is parallel to said internal wall.

* * * * *